April 18, 1933.  C. A. CHASE  1,904,271

SUBMARINE CABLE ANCHORAGE

Filed Dec. 26, 1931

INVENTOR
C.A. CHASE
BY J. W. Schmied
ATTORNEY

Patented Apr. 18, 1933

1,904,271

UNITED STATES PATENT OFFICE

CHARLES A. CHASE, OF NEW YORK, N. Y., ASSIGNOR TO BELL TELEPHONE LABORATORIES, INCORPORATED, OF NEW YORK, N. Y., A CORPORATION OF NEW YORK

SUBMARINE CABLE ANCHORAGE

Application filed December 26, 1931. Serial No. 583,221.

This invention relates to submarine cable signaling systems and particularly to systems of this kind in which a portion of the cable is raised from the sea bottom to connect to a floating station in mid-ocean.

An object of the invention is the reduction of abrasion of the cable against the sea bottom caused by movements of the floating station or of other floats supporting the raised portion of the cable.

It has been proposed to anchor long deep sea cables to floating anchored structures and to establish repeating stations on such structures. By such means large savings in the cost of a cable for communicating between fixed points could be effected. Such structures have been proposed by others for use as airports, for example. The present invention assumes suitable equipment for anchoring the cable to the floating structure and bringing up the insulated conductors thereof to terminal or repeating equipment upon the structure and deals particularly with a method of and apparatus for preventing or reducing abrasion of the cable by dragging upon the sea bottom.

It is well known that a floating station anchored in a deep part of the ocean may move about considerably on the surface of the ocean under the force of wind and current. These movements result in slackening and tightening of the anchoring cables. Similar slackening and tightening would be imparted to the raised portion of a submarine signaling cable connected to the station. Furthermore, that portion of the cable, resting on the sea bottom nearest the raised portion, would be dragged from side to side over the sea bottom, when the station moves laterally with respect to the cable. These movements are continually taking place and the abrasion between the cable and the sea bottom caused thereby would soon result in an impairment of the armoring and insulation of the cable.

In accordance with a feature of the invention, the raised portion of the submarine signaling cable is supported by one or more floats in order to relieve the strain on the cable end which is connected to the station. At a point on the cable, which is near the ocean bottom and is at all times held off the bottom by means of the floats, a connection is made between this point and an anchorage on the ocean bottom by means of a wire hawser, chain, or similar means whereby the movements of the cable between this point and the point of contact with the ocean bottom are greatly reduced, if not eliminated.

Figure 1:
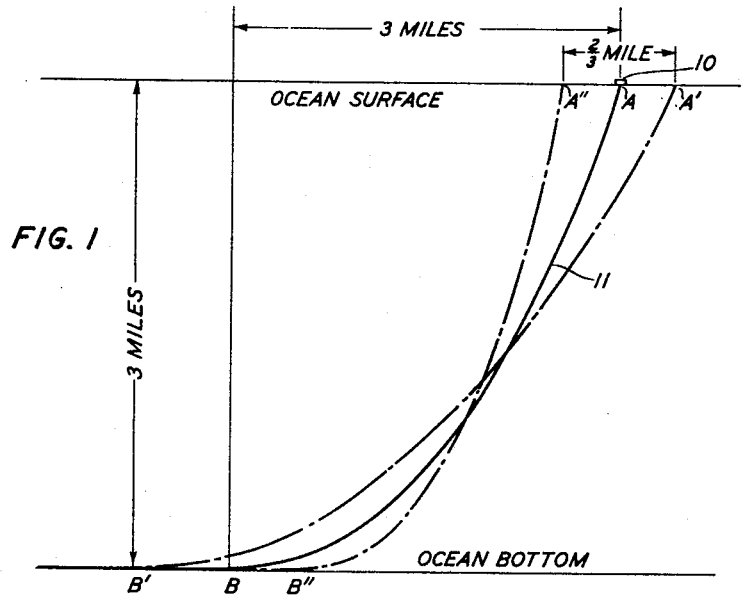
Figure 2:
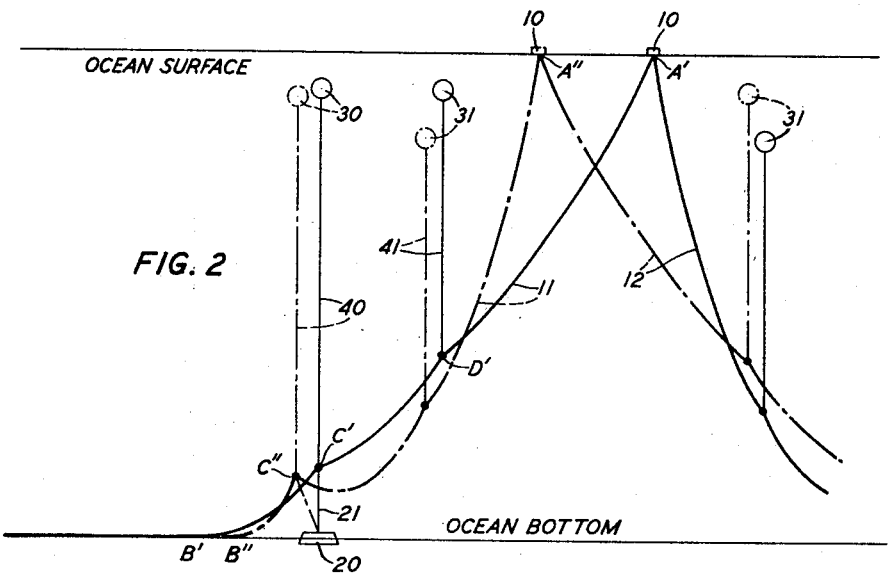

In the following detailed description of the invention, reference will be made to the attached drawing in which:

Fig. 1 illustrates the ordinary movements of a raised cable end fastened to a floating station; and Fig. 2 shows a similar cable anchored and supported in accordance with the invention.

Referring to Fig. 1, the cable 11 is indicated as being fastened at its upper end to a station structure 10 floating on the ocean surface. The cable hangs in a catenary to the sea bottom, where it continues along the bottom. It may be assumed that other similar cables or chains properly anchored are attached to the station structure to secure it in place. Under the condition of no wind or current pressure acting on the station it will occupy an intermediate position, as shown at A on the ocean surface and the catenary of the cable 11 will touch the sea bottom at the point B. However, under the influence of wind and current the station may move over a considerable area of substantially circular outline, and under extreme conditions the station may move either to point A' or A'', in which case the catenary of the cable will touch the sea bottom at points B' or B'', respectively. Thus a considerable length of the cable, perhaps a mile or more, may be raised or lowered from the sea bottom and perhaps drag along the sea bottom due to the motions of the station and thus be subject to wear.

Referring now to Fig. 2, the floating station 10 is connected for electrical communication with another station on shore or in mid-ocean by a cable 11, which for the greater part of its length rests on the sea bottom, and the end of which is raised for connection with the station. It will be assumed that the station 10 is anchored at least partly by means other than the cable 11 in order that its movements on the ocean surface may be limited. In order to relieve the strain due to the weight of the raised portion of the cable on the fastenings at the station 10, this portion is supported by a plurality of submerged floats, such as 30 and 31, attached to the cable by means of anchoring lines 40 and 41. The floats are not deeply submerged but are sufficiently below the surface as to be relatively free of the influence of waves and surface currents. The floats 30 and 31 may be in the form of hollow spheres of steel or other metal. In the drawing the station 10 is illustrated in solid lines at one extreme position A' at which the cable will be tightened so that it touches the ocean bottom at B'.

In order to limit the movements of the lower part of the cable with respect to the sea bottom, an anchorage is provided for a point on the cable near the sea bottom. The anchorage may comprise an anchor 20 of any convenient construction and a connecting chain or cable 21 to the point of the main cable, which may or may not be a point to which a float is connected. As shown in the drawing, the anchoring cable 21 is attached at the point C' to the cable and it may be a continuation of the anchor line 40 to the float 30.

If now the station 10 moves to the other extreme position indicated as A'', the cable 11 will hang in a series of catenaries, as shown by dot and dash lines in the drawing, and will touch the ocean bottom at point B''. The point C' on the cable, being carried by the float 30, will move to the point C'' over an arc having its center in the anchor 20. It is evident that under these conditions most of the slack in the cable is taken up by the length between the points A'' and C'' and that the movements of the cable between the anchoring point and the sea bottom will be greatly limited, with the result that the wear on the cable is greatly reduced.

The restraining action of the anchor 20 upon the lower portion of the cable also reduces the lateral movements of the cable over the sea bottom due to movements of the station at right angles to the direction of the cable.

The station 10 has been described above as being a terminal station at the end of the cable; however, in the case of a mid-way station another cable 12 may serve to continue the circuit and may be supported and anchored in the manner described above for cable 11. In Fig. 2 the full line position of the cable 12 corresponds to the position of cable 11 shown in dot and dash line, whereas the dot and dash line position of cable 12 corresponds to the full line position of cable 11.

It should be understood that the anchor 20 may be connected at a point on the cable, which is not directly supported by a float, and that more than one anchor may be provided and connected at successive points along the cable near the sea bottom with the necessary floats to support the anchored portions. It is also within the scope of the invention to support the cable at the anchorage by some form of cradle structure, especially where the distance to the sea bottom is not excessive; the portions thus rigidly supported from the sea bottom need not be supported by submerged floats. Other obvious modifications may readily be devised which would fall within the scope of the invention.

What is claimed is:

1. A signaling cable on the ocean bottom having a portion thereof raised from the ocean bottom, a float connected to said portion near the ocean bottom at a point which is always off the bottom and anchoring means on the ocean bottom connected to a point on the cable near the connection of said float to reduce the movement of said cable with respect to the ocean bottom.

2. In combination, a floating mid-ocean station, a signaling cable on the ocean bottom having one end thereof raised and connected to said station, a submerged float connected to a point on said cable near the ocean bottom to support said point at all times clear off the bottom, anchoring means on the ocean bottom connected to said point to limit the movement thereof in response to movement of said station.

3. In combination, a floating mid-ocean station, a signaling cable on the ocean bottom having one end thereof raised and connected to said station, a submerged float, anchoring means for said float and a connection between said anchoring means and a point on the raised portion of said cable to limit the movement of said cable at the sea bottom caused by movements of said station.

4. In combination, a floating structure adapted to support a cable end in deep water, one or more points of connection along said cable for the attachment of supplemental supports, one or more floats attached individually to said points by long members allowing said floats to rise near to but not completely to the surface, an anchor at the bottom and a relatively short connection from said anchor to said cable near to but not at a point, where it is permitted to touch bottom.

In witness whereof, I hereunto subscribe my name this 24th day of December, 1931.

CHARLES A. CHASE.